US012361351B2

United States Patent
Corsini et al.

(10) Patent No.: US 12,361,351 B2
(45) Date of Patent: Jul. 15, 2025

(54) DISTRIBUTING ORDER EXECUTION IN A MOM SYSTEM

(71) Applicant: Siemens Aktiengesellschaft, Munich (DE)

(72) Inventors: Giorgio Corsini, Genoa (IT); Andrea Loleo, Genoa (IT); Ernesto Montaldo, Genoa (IT); Giovanni Venturi, Genoa (IT)

(73) Assignee: Siemens Aktiengesellschaft, Munich (DE)

( * ) Notice: Subject to any disclaimer, the term of this patent is extended or adjusted under 35 U.S.C. 154(b) by 151 days.

(21) Appl. No.: 17/307,149

(22) Filed: May 4, 2021

(65) Prior Publication Data

US 2021/0342763 A1   Nov. 4, 2021

(30) Foreign Application Priority Data

May 4, 2020   (EP) .................................... 20172664

(51) Int. Cl.
    *G06Q 10/0631*   (2023.01)
    *G06Q 50/04*     (2012.01)
    *G06Q 50/18*     (2012.01)

(52) U.S. Cl.
    CPC ....... *G06Q 10/06313* (2013.01); *G06Q 50/04* (2013.01); *G06Q 50/188* (2013.01)

(58) Field of Classification Search
    CPC . G06Q 10/06313; G06Q 50/04; G06Q 50/188
    See application file for complete search history.

(56) References Cited

U.S. PATENT DOCUMENTS

| 8,914,512 B2 | 12/2014 | Dellacha et al. |
| 2014/0067105 A1* | 3/2014 | Reggio ................. G05B 15/02 |
| | | 700/97 |

(Continued)

FOREIGN PATENT DOCUMENTS

| CN | 101964081 A | 2/2011 |
| CN | 102103717 A | 6/2011 |

(Continued)

OTHER PUBLICATIONS

Diep et al, "A Distributed Manufacturing Execution System Implemented with Agents: the PADABIS Model", Aug. 2003, IEEE International Conference on Industrial Informatics INDIN 2003, pp. 301-306 (Year: 2003).*

(Continued)

*Primary Examiner* — Andrew Chase Lakhani
(74) *Attorney, Agent, or Firm* — Laurence A. Greenberg; Werner H. Stemer; Ralph E. Locher

(57) ABSTRACT

A method distributes order execution in a MOM system. A GOM module is capable of generating production orders with a negotiable requirement. Each LOM module is capable of offering to the GOM module local order planning functionalities for a production order due to a communication based on a bilateral negotiation exchange with the GOM module on negotiable parameters. The method includes: using past negotiation data exchanged with the LOM module to compute a module providing as output a negotiation reliability score to assign to a negotiation exchange with the LOM module; at runtime, negotiating a negotiable parameter of a specific production order with the LOM module by the specific negotiation model; at runtime, updating the specific negotiation model with tunings obtained by applying runtime data to the corresponding computed reliability module aimed at improving the reliability score; and at (Continued)

runtime, distributing the order execution to the LOM module.

7 Claims, 5 Drawing Sheets

(56) References Cited

U.S. PATENT DOCUMENTS

| | | | |
|---|---|---|---|
| 2015/0058078 A1 | 2/2015 | Ehrenberg et al. | |
| 2015/0105887 A1* | 4/2015 | Troy | G05B 19/41865 700/97 |
| 2016/0070258 A1* | 3/2016 | Raviola | G06Q 10/06 700/100 |
| 2017/0272894 A1* | 9/2017 | Wang | H04L 67/562 |
| 2018/0307213 A1 | 10/2018 | Borriello | |
| 2019/0155262 A1* | 5/2019 | Sundar Singh | G05B 13/0265 |
| 2019/0196442 A1* | 6/2019 | Ezawa | G05B 19/406 |
| 2019/0227503 A1 | 7/2019 | Corsini et al. | |
| 2019/0332995 A1* | 10/2019 | Tseng | G06Q 10/06 |
| 2020/0134374 A1* | 4/2020 | Oros | G06F 8/71 |
| 2020/0259896 A1* | 8/2020 | Sachs | H04W 12/06 |
| 2021/0081837 A1* | 3/2021 | Polleri | G06N 5/022 |
| 2021/0341909 A1* | 11/2021 | Harnesk | G05B 19/41865 |
| 2021/0383271 A1* | 12/2021 | Slinger | G06F 11/3409 |
| 2022/0066412 A1* | 3/2022 | Montaldo | G05B 19/406 |

FOREIGN PATENT DOCUMENTS

| | | | | |
|---|---|---|---|---|
| CN | 106663228 | A | 5/2017 | |
| CN | 107122842 | A | 9/2017 | |
| CN | 110650174 | A | 1/2020 | |
| CN | 110826829 | A | 2/2020 | |
| CN | 110837918 | A | 2/2020 | |
| EP | 3561746 | A1 * | 10/2019 | G06Q 10/06 |
| EP | 3667579 | A1 | 6/2020 | |
| JP | 2009139979 | A | 6/2009 | |

OTHER PUBLICATIONS

Almada-Lobo, "The Industry 4.0 revolution and the future of Manufacturing Execution Systems (MES)", 2015, Journal of Innovation Management JIM 3,4, pp. 16-21 (Year: 2015).*

Alaref and Khan "Industry 4.0 and its Technologies: A Systemic Literature Review", 2021 IEEE International Conference on Industrial Engineering and Engineering Management (2021) (Year: 2021).*

Chen "Intelligent manufacturing production line data monitoring system for industrial internet of things", Computer Communications 151, pp. 31-41, (2019) (Year: 2019).*

Kovacs et al., A planning and management infrastructure for large, complex, distributed projects beyong ERP and SCM, Computers in Industry, 2003, pp. 165-183, vol. 51, Elsevier Science B.V.

* cited by examiner

DISTRIBUTING ORDER EXECUTION IN A MOM SYSTEM

CROSS-REFERENCE TO RELATED APPLICATION

This application claims the priority, under 35 U.S.C. § 119, of European patent application EP 20172664, filed May 4, 2020; the prior application is herewith incorporated by reference in its entirety.

BACKGROUND OF THE INVENTION

Field of the Invention

The invention relates to a method and a system for distributing order execution in a manufacturing operations management (MOM) system.

Most recently, the term MOM is more and more used to replace the term manufacturing executing system (MES). MES/MOM applications and systems can usually contain software used as component or act as component in the sense below explained.

As defined by the Manufacturing Enterprise Solutions Association (MESA International), a MES/MOM system "is a dynamic information system that drives effective execution of manufacturing operations", by managing "production operations from point of order release into manufacturing to point of product delivery into finished goods" and by providing "mission critical information about production activities to others across the organization and supply chain via bi-directional communication."

The functions that MES/MOM systems usually include, in order to improve quality and process performance of manufacturing plants, are resource allocation and status, dispatching production orders, data collection/acquisition, quality management, maintenance management, performance analysis, operations/detail scheduling, document control, labor management, process management and product tracking.

For example, the Siemens Corporation offers a broad range of MES/MOM products under its Opcenter® product family.

In general, a MOM system can be seen as an information system that connects, monitors and controls complex manufacturing production processes and data flows within an enterprise, whose main goal is to ensure the effective execution of the manufacturing operations and improve the production output.

Traditionally, a MOM system has been always designed as a monolithic, single-plant and central-based application wherein a central module embraces all the decision capabilities and wherein the communication among different MOM modules is configured and implemented adhering to traditional communication paradigms.

However, with the latest industrial trends like for example the globalization of customers and competitors and with the new manufacturing initiatives like for example the Industry 4.0, the new generation of MOM systems is required to meet the need of the new production process paradigms.

The Industry 4.0 has created the idea of a "smart factory" whose major design principle is the concept of distribution of components which are capable of interacting with each other and which are capable of performing their tasks as autonomously as possible based on local decision-making criteria.

These new views drive toward a wider geographic distribution of production sites.

Traditional MOM systems are unable to cope with such new distributed environments where the manufacturing production processes are described as a set of decomposed functionalities that are hierarchically distributed across the geographic distributed enterprise.

In order to meet these new requirements, modern MOM systems have been introduced, being able to provide a set of distributed, self-descriptive and autonomous functionalities capable of cooperating at different enterprise levels.

Among the whole set of MOM functionalities, the Order Management is one of the most important and critical functionalities.

As used herein, with "Order Management" is intended the set of enterprise processes in charge of tracking the customer orders and of providing the right planning and resources capabilities for fulfilling the order needs.

With the new industry trends, this functionality cannot be configured as a monolithic, single-plant application anymore and, instead, it should rather be conceived as a set of autonomous/independent and distributed functionalities that are able to act at different enterprise levels.

The Order Management ("OM") should then thus configured as a combination of a set of autonomous capabilities.

This set of autonomous OM capabilities is made of Global Order Management ("GOM") capabilities for providing global order planning and order engineering capabilities and Local Order Management ("LOM") capabilities for providing order planning and order execution capabilities.

GOM provides the entry point for collecting customer orders from an ERP system and Bill of Process ("BoP") and Bill of Material ("BoM") data from a PLM software, where the BoP and BoM data are respectively referred as the definition of the production process required to produce a product and the required materials. Additionally, GOM provides the logic to create production orders and split the production orders in some sub orders.

On the other hand, LOM provides local order planning functionalities, such as scheduling of an order according to plant-specific constraints and production order execution.

It is noted that in a typical distributed production environment both GOM and LOM can have multiple instances running at the same time at different enterprise levels.

The GOM, which is executed at the top levels of the enterprise hierarchy, e.g. such as corporate levels, should be able to interact with multiple and distributed LOM instances that are executed at the bottom levels of the enterprise hierarchy, e.g. such as sites, areas and production lines.

In such a highly distributed system, the degree of autonomy of each module increases with the complexity and the distribution of the system itself.

This steers toward a set of distributed functionalities acting to achieve different production goals.

For instance, the production goals for a central, HQ-located, module that acts to satisfy global (enterprise) targets can be quite different from the goals of a plant-located module that acts to satisfy local (on-site/on-area/on-line) targets.

Examples of targets include but are not limited by, resources optimization, production quality improvements, production time optimization and sustainability optimization.

To solve the communication drawbacks of the new distributed MOM model, published European patent application EP18212349.7 discloses a negotiation-based process to coordinate the distribution of GOM and LOM capabilities within a MOM system.

Advantageously, the disclosed negotiation process is an efficient mechanism to solve conflicts when GOM and LOM have different and potentially opposite targets.

However, according to previously disclosed negotiation-based techniques for coordinating the distribution of MOM order management, the GOM is unaware of the reliability of each LOM order executor and of the commitments that the LOM has guaranteed to take on itself.

Improved techniques which distribute in reliable and optimized manner the order management across GOM and LOM modules are desirable.

BRIEF SUMMARY OF THE INVENTION

It is therefore an aim of the present invention to provide a method and a system for distributing order execution in a MOM system in a reliable manner.

The aforementioned aim is achieved by a method and a system for distributing order execution in a MOM system, whereby order management functionalities are distributed as two or more independent modules across two or more enterprise levels, containing a global order management module, hereinafter GOM module, and a set of local order management modules, hereinafter LOM modules. The GOM module is capable of generating one or more production orders with at least one negotiable requirement. Each LOM module is capable of offering to the GOM module local order planning functionalities, including scheduling and execution, for a production order as a result of a communication based on a bilateral negotiation exchange with the GOM module on one or more negotiable parameters in accordance with a specific negotiation model. The method includes:
  a) using past negotiation data exchanged with a given LOM module to compute a module providing as output a negotiation reliability score to assign to a negotiation exchange with the given LOM module;
  b) at runtime, by the GOM module, negotiating a negotiable parameter of a specific production order with the given LOM module by means of the specific negotiation model;
  c) at runtime, updating the specific negotiation model with tunings obtained by applying runtime data to the corresponding computed reliability module aimed at improving the reliability score; and
  d) at runtime, by the GOM module, distributing the order execution to the given LOM module whereby an agreement on at least one negotiable requirement has been obtained by means of the updated specific negotiation model.

In embodiments, the reliability module may advantageously be updated with new data.

In embodiments, the negotiation model may conveniently be updated by modifying a constraint of a negotiation parameter, a weight of a negotiation parameter, a negotiation deadline time and/or a coefficient of a scoring function.

Furthermore, a computer program element can be provided, containing computer program code for performing steps according to the above mentioned method when loaded in a digital processor of a computing device.

Additionally, a computer program product stored on a computer usable medium can be provided, containing computer readable program code for causing a computing device to perform the mentioned method.

Embodiments enable the GOM module—the commissioner of execution of production orders—to adapt its behavior according to the history of the negotiation threads.

In embodiments, the GOM module not only considers the list of attributes that should be evaluated to decide how, and under which conditions, to request the execution of production orders, but it also considers additional information on "reliability" of each order executor—LOM module—against the commitments that the order executor itself has guaranteed to take.

In embodiments, if a specific LOM module did not meet its commitments in the past, the GOM module is capable to change its behavior with regard this specific LOM module. Moreover, with embodiments, the GOM module is capable to recognize if this deficiency happened occasionally in the past or if it happened on a regular basis.

Embodiments enable optimizing and coordinating distributed MOM order management functionalities by taking into account past LOM behavior during each negotiation.

In embodiments, a GOM module is capable to adjust its knowledge base considering the outcomes of past negotiations.

Embodiments enable coordinating independent distributed MOM functionalities by means of negotiation protocols and historical data analysis providing a reliability index.

Embodiments enable designing a MOM functionality as a self-descriptive, autonomous, and distributable functionality.

Embodiments enable providing a negotiation model able to provide the reasoning to manage the distribution of MOM functionalities.

Embodiments enable optimizing resource utilization, reducing production time and/or to improve the manufacturing plant utilization.

Embodiments provide a communication strategy suitable for different components of various integrated MOM applications running in a fully distributed environment.

Embodiments provide an adaptive negotiation-based technique for distributing MOM order execution based on historical data analysis.

Embodiments enable managing and coordinating distributed order management functionalities by assigning the execution, from a management module to an execution module, in a flexible manner by checking the production goal optimization whilst taking into account historical data providing valuable information about the reliability of each production order executor.

Other features which are considered as characteristic for the invention are set forth in the appended claims.

Although the invention is illustrated and described herein as embodied in distributing order execution in a MOM system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Referring now to the figures of the drawings in detail and first, particularly to FIGS. 1-5 thereof, there is shown and discussed below, the various embodiments described herein are by way of illustration only and should not be construed in any way to limit the scope of the disclosure. Those skilled in the art will understand that the principles described herein may be implemented in any suitably arranged device.

Figure 1:
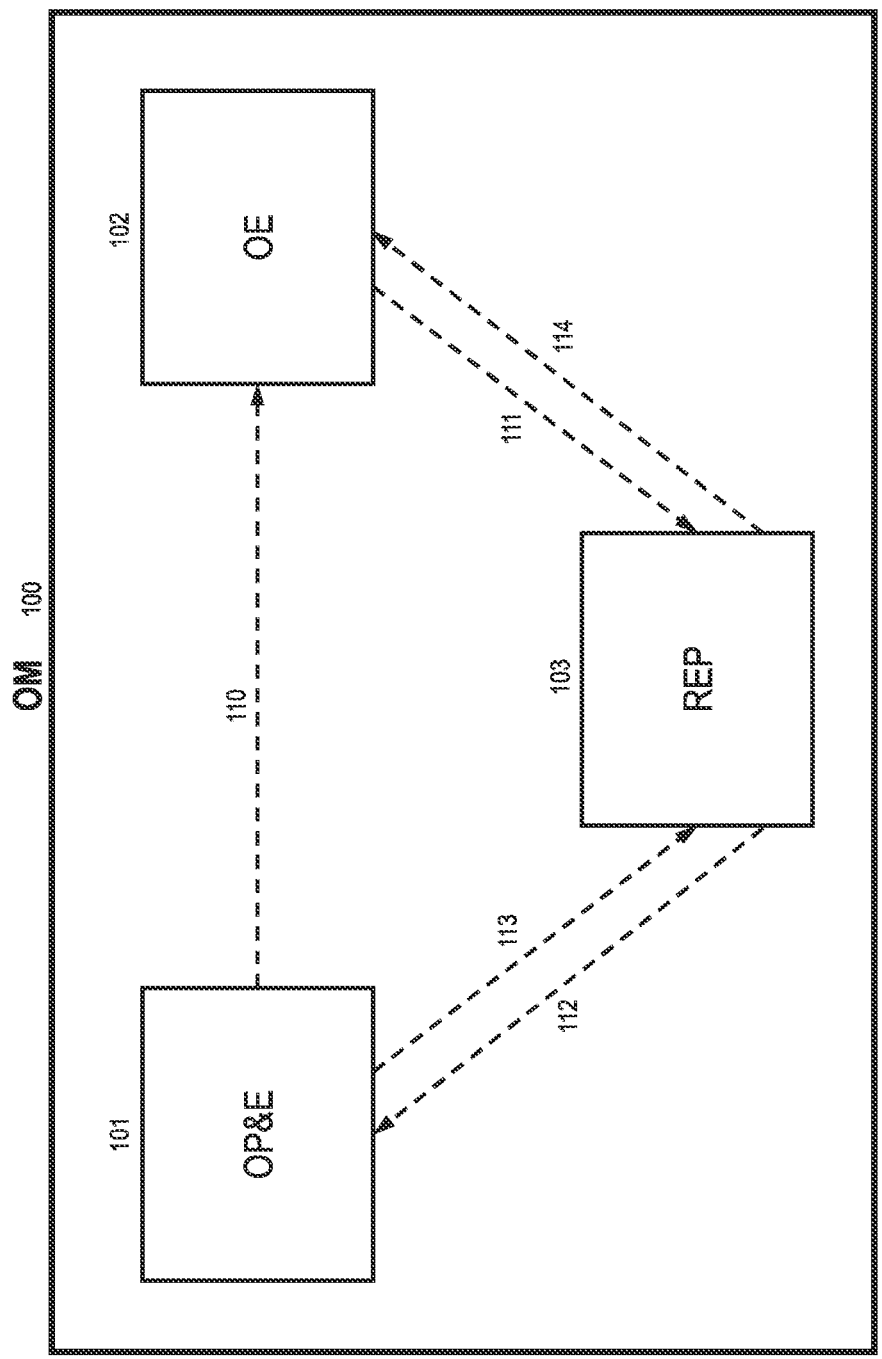
FIG. 1 is a block diagram schematically illustrating an architecture for order management and order execution in a traditional MOM System (Prior Art)

FIG. 1 is a block diagram schematically illustrating the architecture for order management and order execution in a traditional MOM System (Prior Art).

An introduction to how the OM functionality is implemented in a traditional prior art MOM system now follows.

In a traditional MES system, the OM is a single-plant and monolithic application including both OM and Order Execution ("OE"). In the art, such application is typically called Order Management System or Production Order Management System. As shown in FIG. 1, the OM is designed as a single functionality. Within the OM module 100, an Order Planning and Engineering ("OP&E") module 101 sends a request 110 for order execution to the OE module 102 which stores 111 the order execution data in the repository 103. Order execution data are retrieved 112 from the repository 103 by the OP&E module 101. Order management data are stored 113 in the repository 103 and order management data for execution are retrieved 114 from the repository 103 by the OE module 102.

An introduction to a prior art MOM system according to a modern distributed approach now follows.

In a modern decentralized approach, the MOM order management is distributed in accordance with the enterprise hierarchy, the OM is divided into several independent functionalities executable in a distributed and hierarchical system.

In an exemplary distributed scenario, one GOM module interacts with a plurality of LOM modules. The GOM runs in this scenario as a single instance and it is deployed at one of the top levels of the enterprise hierarchy like for example at the headquarters; while the LOM runs as multiple instances and are deployed at a plurality of bottom levels of the enterprise hierarchy like for example at the sites, at the areas and/or at the production lines.

Assume that at a certain point in time, at the top central enterprise level where resides the responsibility for global order planning and order engineering, it is requested to produce a specific number of products that are related to a given amount of customer orders. Such products are to be produced under certain product requirements. Examples of product requirements include, but are not limited by, production quality level, maximum time range for completing the customer orders production, production pollution level, optimization of production energy consumption.

Assume that within the enterprise hierarchy, there are several plants that are able to produce those products by providing local order planning and execution functionalities and each LOM is able to provide the requested productions under certain specific conditions.

For example, production quality levels may differ from plant to plant since some plants may be fully automated while some others may be fully manual or may be operated in an "hybrid mode".

For example, maximum time range for completing the customer orders production may differ from plant to plant due to differences in types of equipment pieces and to differences in equipment availabilities.

For example, production pollution level may differ from plant to plant due to the fact that the different regions of a global enterprise may have different pollution regulations.

For example, energy consumption optimization may differ from plant to plant due to the fact that the different regions of a global enterprise may have different contracts with different energy providers.

In order to optimize and efficiently coordinate the multiple and diverse interactions that arise in such distributed scenarios between the GOM and the LOM, a communication with a negotiation process is taught in European patent application EP18212349.7.

As used herein, the term "Negotiation" is generally defined as "a process by which a joint decision is made by two or more parties. The parties first verbalize contradictory demands and then move towards agreement by a process of concession making or search for new alternatives" (D. G. Pruitt, Negotiation Behavior. Academic Press, 1981).

In a MOM distributed environment, the negotiation is a bilateral process that happens between one GOM and a set of LOMs.

Figure 2:
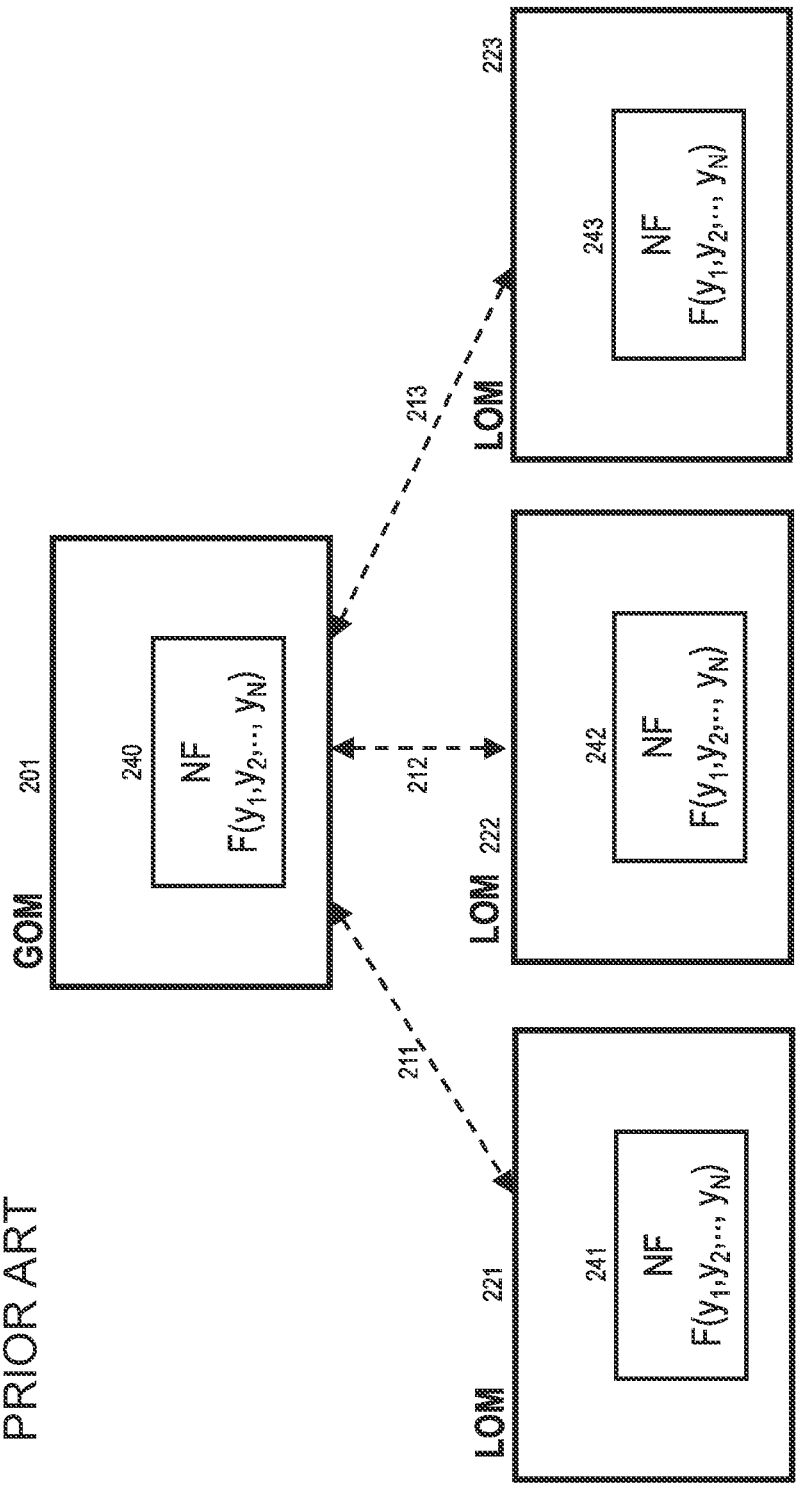
FIG. 2 is a block diagram schematically illustrating an exemplary architecture for order management and order execution in a distributed MOM system coordinated by a negotiation protocol (Prior Art)

FIG. 2 is a block diagram schematically illustrating an exemplary architecture for order management and order execution in a distributed MOM system coordinated by a negotiation protocol (Prior Art).

The negotiation process, which is formalized by a negotiation protocol and a set of negotiation functions, is based on a set of mutual interactions based on a set of parameters representing the so-called "knowledge base".

The negotiation involves the GOM and the LOMs by an iterative process that is organized in several turns that are made of offers and counter-offers with the aim to reach a common agreement. When the agreement is reached the negotiation is considered terminated. A negotiation can be terminated also when it reached the time limit; each negotiation process has always a time interval where the negotiation threads is required to occur.

In FIG. 2 the exemplary distributed MOM architecture consists of one GOM module 201 and a plurality of LOM modules 221, 222, 223, whereby the GOM module 201 may for example be located at the headquarters, in a hub or in a regional headquarter and whereby each LOM module 221, 222, 223 may for example be located on a local site, area or production line. The GOM module 201 comprises a negotiation function ("NF") module 240 with a function $F(x1, x2, \ldots, xN)$ and it negotiates with each of the LOM modules 221, 222, 223 via a negotiation protocol 211, 212, 213. Each LOM module 221, 222, 223 comprises a negotiation function module 241, 242, 243 with a function $F(y1, y2, \ldots, yN)$.

From the negotiation process point of view, three important aspects are the negotiation model, the shared negotiation parameters and the negotiation protocols.

The negotiation model is the reasoning model on which the negotiation process is based on and it provides: i) the required business logic to manage the entire negotiation process; ii) the decision about which LOM modules are available, whether they can satisfy the required production and under which conditions; iii) the capabilities to decide what the initial offer should be, what counter offer should be generated, when an agreement is reached and when a negotiation should be abandoned/cancelled.

The negotiation parameters are used in the negotiation process and are shared among all modules, both GOM and LOM modules. Even if parameters are the same for all modules, each parameter may have a different importance for different instances. Each parameter may have different importance between GOM and LOM instances and also among different LOM instances. Additionally, these parameters may also be different in the domain range because they reflect a real-time situation. In fact, for example, the number of orders that can be managed by a LOM module can vary over time depending on equipment availability. Examples of negotiation parameters include, but are not limited by, the production quality that should be satisfied by a production process, the time range within the production orders should be completed, the pollution constraints, the energy consumption optimization.

The negotiation protocol formalizes how the interaction should occur and consists in the set of states for the negotiation process.

Figure 3:
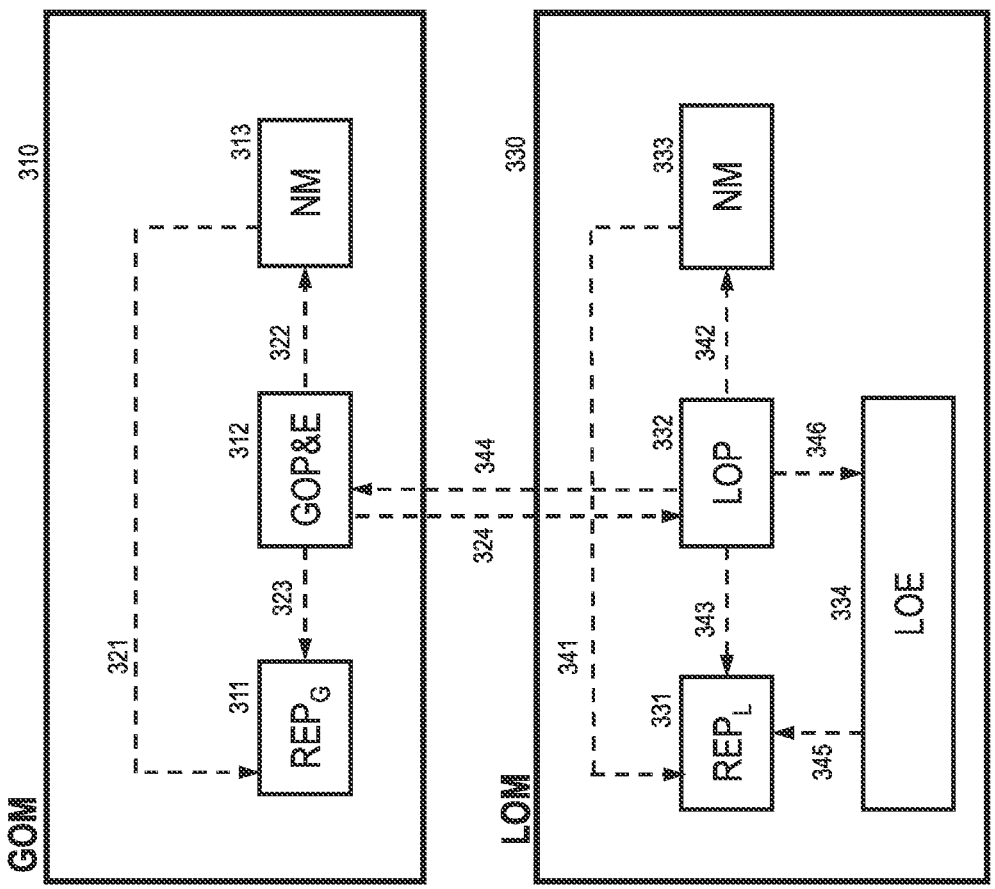
FIG. 3 is a block diagram schematically illustrating an example of architecture for global order management and local order execution with a negotiation-based approach in a distributed MOM system (Prior Art)

FIG. 3 is a block diagram schematically illustrating an example of architecture for global order management and local order execution with a negotiation-based approach in a distributed MOM system (Prior Art).

FIG. 3 is an example of a negotiation-based technique for coordinating distributed MOM order management similar to the technique proposed in European patent application EP18212349.7.

The GOM module 310 contains the following components:
- the repository 311 for storing planning and engineering data 323 in accordance to a pre-defined MOM domain model for order management. In embodiments, this or other repositories may also be used to persist the negotiation model 313 and each negotiation thread;
- the Global OP&E component 312 responsible for applying the business logic for order planning and order engineering; and
- the Negotiation Model 313 which is the reasoning model used by the GOM module to provide negotiation capabilities.

The LOM module 330 contains the following components:
- the repository 331 for storing planning and engineering data in accordance to a pre-defined MOM domain model for order management. In embodiments, this or other repositories may also be used to persist the negotiation model 313 and each negotiation thread;
- the Local Order Planning ("LOP") 332 component responsible for applying the business logic for order planning. The LOP component 332 communicates with its global counter-part GOP&E 312 and it is also responsible for triggering an order execution;
- the Local Order Execution ("LOE") component 334 responsible for applying the business logic for order execution; and
- the Negotiation Model which is the reasoning model used by the GOM module to provide negotiation capabilities.

As shown in FIG. 3, the GOM module 310 is in communication with a LOM module 330 for dynamically managing the distribution of the execution of production orders with a negotiation-based approach.

The GOM module 310 contains a repository 311, a global order planning and engineering (GOP&E) module 312. The GOP&E module 312 stores 323 global order planning and engineering data in the repository 311. The GOP&E module 312 negotiates local order execution with the LOP module 332 by means of offers/counter offers 324, 344 whereby the GOP&E module 312 and the LOP module 332 make respectively use of the negotiation model 313, 333, "use" 322, 342. Each negotiation module 313, 333 is stored in its repository 311, 331 via "use" 321, 341. The LOP module 332 stores 343 local order planning data in the repository 331 and sends 346 requests for order execution to the LOE module 334. The LOE module 334 stores 345 order execution data in the repository 331.

Figure 4:
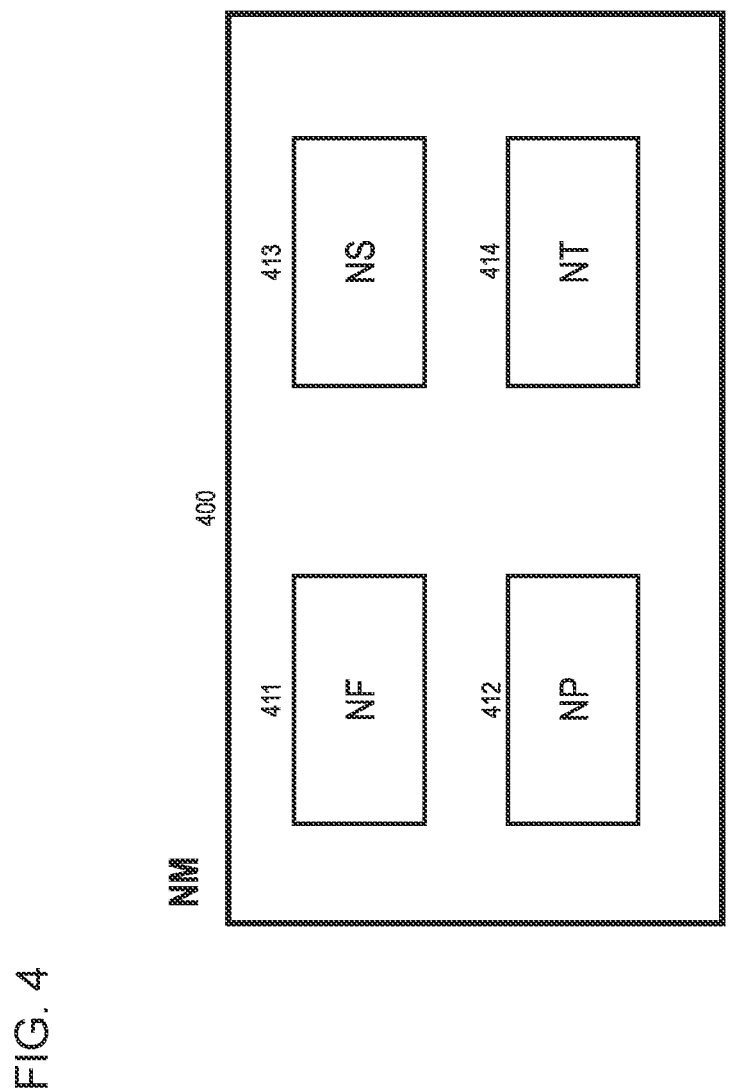
FIG. 4 is a block diagram schematically illustrating elements of a negotiation module according to the invention.

FIG. 4 is a block diagram schematically illustrating elements of a negotiation module.

The negotiation module 400 includes a negotiation function 411, a negotiation protocol 412, a negotiation strategy 413, and a negotiation tactic 414.

The negotiation tactic 414 may be time dependent, resource dependent and imitative: +TimeDependent( ): int; +ResourceDependent( ): int; +Imitative( ): int. In other words, the negotiation may give priority to time optimization, resource or replication of past actions. For example, the user may require that the order is completed in "x" hours, then the fastest resource is used, the user may require that a specific resource is used, or the user may require to replicate the process of a past order.

Figure 5:
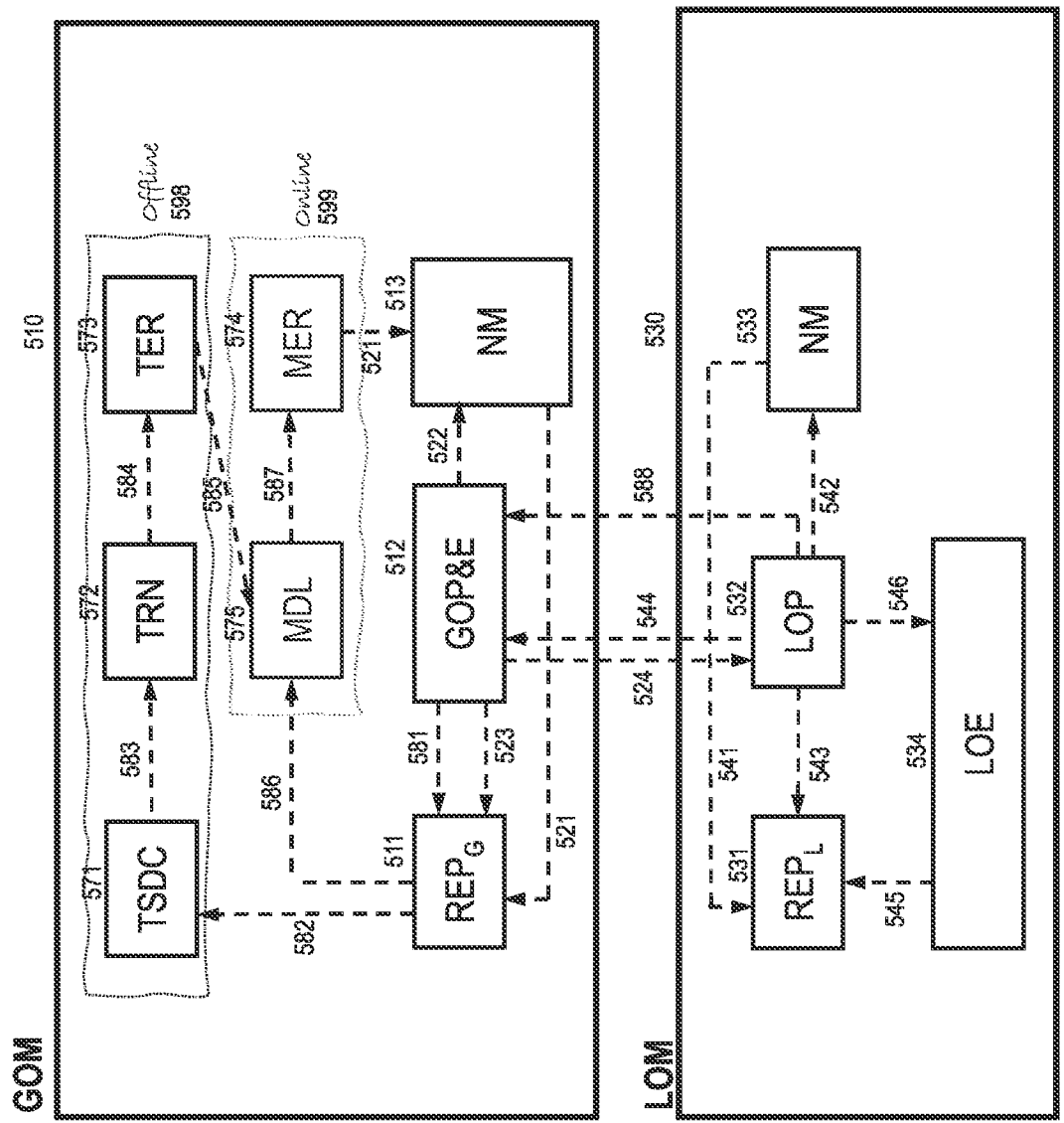
FIG. 5 is a block diagram schematically illustrating an exemplary architecture whereby the GOM module is enabled to adapt its behavior according to negotiation history data in accordance with disclosed embodiments.

Examples of negotiation modules 400 are the negotiation modules 313, 333 of FIG. 3 and the negotiation modules 513, 533 of FIG. 5.

At least some embodiments of the present invention address the above described issues in which order execution is distributed in a MOM system. Order management functionalities are distributed as two or more independent modules across two or more enterprise levels, containing a GOM module and a set of LOM modules.

The GOM module is capable of generating one or more production orders with at least one negotiable requirement. Each LOM module is capable of offering to the GOM module local order planning functionalities, including scheduling and execution, for a production order as a result of a communication based on a bilateral negotiation exchange with the GOM module on one or more negotiable parameters in accordance with a specific negotiation model.

Past negotiation data exchanged with a given LOM module is used to compute a module providing as output a negotiation reliability score to assign to a negotiation exchange with the given LOM module.

The GOM module negotiates at runtime a negotiable parameter of a specific production order with the given LOM module by means of the specific negotiation model.

The specific negotiation model is updated with tunings obtained by applying runtime data to the corresponding computed reliability module aimed at improving the reliability score.

At runtime, the GOM module distributes the order execution to the given LOM module whereby an agreement on at least one negotiable requirement has been obtained by means of the updated specific negotiation model.

FIG. 5 is a block diagram schematically illustrating an exemplary architecture whereby the GOM module is enabled to adapt its behavior according to negotiation history data in accordance with disclosed embodiments.

FIG. 5 is an exemplary architecture of global order management and of local order management and execution comprising historical data analysis in accordance with disclosed embodiments.

In embodiments, within the GOM module 510 there are certain modules 571-575 operating offline 598 and others operating online 599.

In embodiments, the following three modules 571, 572, 573 are operating offline 598: the Temporary Storage and Data Cleansing ("TSDC") module 571, the Supervised/Unsupervised Training ("TRN") module 572 and the Training Evaluation Results ("TER") module 573.

The TSDC module 571 is a staging area where all the data are temporary stored to be cleaned and normalized. The TRN module 572 is a module where historical data are observed and used as training data in order to learn from the previous negotiation threads.

The ("TER") module 573 is a module where the output from the Supervised/Unsupervised Training module is analyzed to classify how the negotiations behaved in the past and it uses then such evaluations to update the Model module 575 as below explained.

In embodiments, the TRN and TER modules 572, 573 enable the system to adjust the negotiation Key Performance Indicators ("KPI") from a record history of normalized past actions.

In embodiments, the following two modules 574, 575 are operating online 599: the Model module 575 and the Model Evaluation Results ("MER") module 574.

The Model module 575, herein also called the reliability module, is a module where all previous negotiations are formalized as a model, it is updated by the TER module 573 and it is derived by the TRN module 572. In embodiments, the model module 575 specifies the negotiation strategy based on the KPIs of the above modules.

The MER module 574 is the module where the outputs/suggestions 587 from the Model module 575 are analyzed and it is also responsible for updating the negotiation model module 513 according to these outputs.

As shown in FIG. 5, the TSDC module 571 retrieves historical data 582 from the repository 511 and sends cleansed data 583 to the TRM module 572. The TRN module 572 sends training output data 584 to the TER module 573. The TER module in turns performs online model tunings 585 on the Model module 575, a run-time match of the historical model with the online model. The Model module 575 retrieves runtime data 586 from the repository 511 and sends model output data 587 to the MER module 599 which then updates 521 the negotiation model 513.

The GOM module 510 contains also a repository 511 and a GOP&E module 512. The GOP&E module 512 stores global order planning and engineering data 543 and committed data and production data 581 in the repository 511. The GOP&E module 512 negotiates local order execution with the LOP module 532 by means of offers/counter-offers 524, 544 whereby the GOP&E module 512 and the LOP module 532 make respectively use of the negotiation model 513, 533, "use" 522, 542. Each negotiation module 513, 533 is stored in its repository 511, 331 via "use" 521, 541. The LOP module 532 stores 543 local order planning data in the repository 531 and sends 546 requests for order execution to the local order execution LOE module 534. The LOE module 534 stores 545 order execution data in the repository 531.

Embodiments comprise two phases, a first phase called "configuration and update phase" and a second phase called "execution phase".

The first phase comprises the steps for instructing the system about the whole negotiation threads that occurred in the past.

The second phase includes the steps for using the previously instructed model for predicting the reliability of one or more negotiators.

I Phase—"Configuration and Update Phase"

In embodiments, the first phase of "configuration and update phase" contains a sub-phase of configuration in which the evaluation strategy is configured and a sub-phase of model updating once new negotiation data are available.

In embodiments, in the configuration sub-phase, the model is instructed about previous negotiations available so far; let this be time $t_0$ i.e. where the procedure is instantiated for the very first time. In embodiments, in the update sub-phase new data are dynamically added to instruct the model with new patterns; let this be time $t > t_0$, i.e. where procedure has been up and running for a while.

In embodiments, the configuration sub-phase comprises five steps c1)-c5) and the update sub-phase comprise two steps u1) and u2).

c1)-c5) Steps of Configuration Sub-Phase c1) Retrieving Historical Data Related to All Negotiation Threads Occurred in the Past Between the GOM Module and Each LOM Module.

At the end of each successful negotiation, both GOM and LOM modules reached an agreement where the LOM module committed itself to supply the execution of production orders under certain conditions requested by the GOM module.

Each ended negotiation provides data that are important for the historical analysis to correctly catch the inconsistencies between what was negotiated and what was performed.

Examples of parameters which are important for the analysis include, but are not limited by:

importance of each parameter that is being used in each negotiation thread, e.g. representable with a weight; in fact, as above already explained, each negotiation thread, in a negotiation process, is carried around a set of parameters that may have different importance for each negotiator);

maximum allowable time defining the deadline after which its negotiation process should be terminated; and instance time where a negotiation thread occurred, providing valuable hints on how offers and counter-offers changed when approaching the deadline.

The following is an example of a valid parameter record for a validation dataset: $\{Param_{1,j}, Param_{2,j}, Param_{i,j}, Weight_{1,j}, Weight_{2,j}, Weight_{i,j}, T_j/T_{max}, T_{max}\}$.

Where:

$Param_{i,j}$ is the i-th parameter used in the negotiation for the j-th negotiation thread $Weight_{i,j}$ is the i-th weight associated to the i-th parameter or the j-th negotiation thread;

$T_j/T_{max}$ is the percentage of time past for the j-th negotiation thread; and $T_{max}$ is the maximum time within the negotiation process should be completed.

c2) Preparing the Data to Correctly Instruct the Model.

In this step, the data of the table are cleaned by eliminating all the errors (data preparation), and normalized to adjust the values, which were measured on different scales, to a common scale.

c3) Instructing the Model that is Going to be Used to Evaluate the Negotiation Threads.

In embodiments, this model, a reliability model, may work with the "black-box" principle, by providing an output, the Degree of Reliability ("DoR") according to the set of data that has been submitted as input.

c4) Retrieving the output from the training step to analyze the results compared to the training data.

In embodiments, the output of the training data is a "Degree of Reliability" ("DoR") that is a classification with normalized values between 0 and 1, where 1 means "100% reliable" and 0 means "0% reliable". Examples of how such values might be decoded is shown in table 1 below.

TABLE 1

| Degree of Reliability (Value Range) | Reliability Classification |
| --- | --- |
| [0; 0.25) | Strongly not reliable |
| [0.25; 0.5) | Partially not reliable |
| [0.50; 0.75) | Partially reliable |
| [0.75; 1) | Strongly reliable | c5) Tuning the Model to Improve the Accuracy of the Model Itself.

u1),u2) Steps of Update Sub-Phase:

u1) Retrieving the values of a negotiation thread happened at the previous negotiation iterations to dynamically and recursively update the previously instructed model providing the last negotiations outcomes to update the historical data that is going to be used for further evaluations.

u2) Repeating Steps c2) to c4).

Advantageously, with the configuration and update phase, it is provided a model capable of recognizing, at runtime, a condition where a specific LOM module which is negotiating with the GOM module is potentially reliable or unreliable (DoR).

II Phase—"Execution Phase"

In this phase, the previously instructed model is asked to provide a classification for evaluating the degree of reliability.

In embodiments, the execution phase includes three main steps e1)-e3).

e1)-e3) Steps of Execution Phase:

e1) Retrieving runtime data of the current negotiation threads and using these data to get a response from the model about the DoR classification.

e2) Analyzing the response from the model to understand if the counterpart in the negotiation is potentially reliable or unreliable.

e3) Updating the negotiation model according to the DoR classification that has been analyzed at the previous step e2).

The negotiation model of the GOM model is then updated accordingly, whereby the GOM module uses the DoR classification to adapt the negotiation strategies and tactic accordingly.

In embodiments, before starting a new negotiation, the negotiation model is preferably updated by modifying the tactic like e.g. the time-dependent tactic and/or by modifying the knowledge base.

In embodiments, the time-dependent tactic may be modified by decreasing the negotiation time deadline and give to the counterpart in the negotiation a smaller amount of time to get an agreement (that is to decrease the chance that the LOM module can get an agreement with the GOM module). The tactic may also be modified by changing the coefficient of the scoring function letting the GOM module to anticipate or postpone the way it is going to make bigger offers.

In embodiments, the knowledge base may be modified by an increase by the GOM module of the negotiation parameters constraints (e.g. by reducing the interval of accepted values) or by a change of the weight assigned by the GOM module to each parameter (e.g. by increasing the importance of the most important parameter versus the less important one).

In embodiments, with further approximations, the target may preferably be to achieve a DoR closer to the maximum value 1.

In embodiments, the distribution of order managements is based on a negotiation including historical data analysis.

In embodiments, the communication among distributed OM modules is configured via state machines of a negotiation protocol based on a set of configurable parameters.

In embodiments, before starting a negotiation, a set of negotiation parameters is defined.

In embodiments, a module for collecting historical data is provided.

In embodiments, a module to dynamically update the negotiation model is provided.

The invention claimed is:

1. A method for distributing order execution in a manufacturing operations management (MOM) system of a factory, wherein order management functionalities are distributed as at least two independent modules across at least two enterprise levels, including a global order management (GOM) module, and a set of local order management (LOM) modules, wherein the GOM module being capable of generating at least one production order with at least one negotiable requirement, wherein each of the LOM modules being capable of offering to the GOM module local order planning functionalities, including scheduling and execution, for the at least one production order as a result of a communication based on a bilateral negotiation exchange with the GOM module on at least one negotiation parameter in accordance with a specific negotiation model, which comprises the steps of:

using past negotiation data exchanged with a given LOM module of the LOM modules to compute a module providing as an output a negotiation reliability score to assign to a negotiation exchange with the given LOM module;

negotiating at runtime, by the GOM module, the at least one negotiable parameter of a specific production order with the given LOM module by means of the specific negotiation model;

obtaining an updated specific negotiation model by updating during the runtime, the specific negotiation model with tunings obtained by applying runtime data to a corresponding computed reliability module aimed at improving the negotiation reliability score;

distributing during the runtime, by the GOM module, the order execution to the given LOM module whereby an agreement on the at least one negotiable requirement has been obtained using the updated specific negotiation model; and executing the at least one production order to produce a product on a production line of the factory under the control of the given LOM module according to the at least one negotiable requirement obtained using the updated specific negotiation model;

wherein the GOM module has modules operating offline including a temporary storage and data cleansing (TSDC) module, a supervised/unsupervised training (TRN) module, and a training evaluation results (TER) module;

wherein the GOM module has at least one module operating online including the reliability module;

wherein the TSDC module is a staging area where the past negotiation data are temporarily stored to be cleansed and normalized into historical data;

wherein the TRN module observes the historical data and uses the historical data as training data to learn from previous negotiation threads; and wherein the TER module analyzes output from the TRN module to obtain classifications of how past negotiations behaved and the TER module updates the reliability module based on the classifications.

2. The method according to claim 1, which further comprises updating the corresponding computed reliability module with new data.

3. The method according to claim 1, which further comprises updating the specific negotiation model by modifying a constraint of the at least one negotiation parameter, a weight of the at least one negotiation parameter, a negotiation deadline time and/or a coefficient of a scoring function.

4. A system for distributing order execution in a manufacturing operations management (MOM) system in a factory, whereby order management functionalities are distributed as at least two independent modules across at least two enterprise levels, including a global order management (GOM) module and a set of local order management (LOM) modules, wherein the GOM module is capable of generating at least one production order with at least one negotiable requirement, wherein each of the LOM modules being capable of offering to the GOM module local order planning functionalities, including scheduling and execution, for a production order as a result of a communication based on a bilateral negotiation exchange with the GOM module on at least one negotiable parameter in accordance with a specific negotiation model, the system comprising:

the GOM module configured to:

use past negotiation data exchanged with a given LOM module of the LOM modules to compute a module providing as an output a negotiation reliability score to assign to a negotiation exchange with the given LOM module;

negotiate at runtime the at least negotiation parameter of a specific production order with the given LOM module by means of the specific negotiation model;

obtain an updated specific negotiation model by updating, during the runtime, the specific negotiation model with tunings obtained by applying runtime data to a corresponding computed reliability module aimed at improving the negotiation reliability score; and distribute during the runtime the order execution to the given LOM module whereby an agreement on the at least one negotiable requirement has been obtained using the updated specific negotiation model;

the system configured to execute the at least one production order to produce a product on a production line of the factory under the control of the given LOM module according to the at least one negotiable requirement obtained using the updated specific negotiation model;

wherein the GOM module has modules operating offline including a temporary storage and data cleansing (TSDC) module, a supervised/unsupervised training (TRN) module, and a training evaluation results (TER) module;

wherein the GOM module has at least one module configured for operating online including the reliability module;

wherein the TSDC module is a staging area configured for temporarily storing the past negotiation data to be cleansed and normalized into historical data;

wherein the TRN module is configured for observing the historical data and using the historical data as training data to learn from previous negotiation threads; and wherein the TER module is configured for analyzing output from the TRN module to obtain classifications of how past negotiations behaved and the TER module is configured for updating the reliability module based on the classifications.

5. The system according to claim 4, wherein the corresponding computed reliability module is updated with new data.

6. The system according to claim 4, wherein the specific negotiation model is updated by modifying a constraint of the at least one negotiation parameter, a weight of the at least one negotiation parameter, a negotiation deadline time and/or a coefficient of a scoring function.

7. A non-transitory computer readable medium containing computer executable instructions for performing a method for distributing order execution in a manufacturing operations management (MOM) system of a factory, wherein order management functionalities are distributed as at least two independent modules across at least two enterprise levels, containing a global order management (GOM) module and a set of local order management (LOM) modules, wherein the GOM module being capable of generating at least one production order with at least one negotiable requirement, wherein each of the LOM modules being capable of offering to the GOM module local order planning functionalities, including scheduling and execution, for a production order as a result of a communication based on a bilateral negotiation exchange with the GOM module on at least one negotiation parameter in accordance with a specific negotiation model, which comprises the steps of:

using past negotiation data exchanged with a given LOM module of the LOM modules to compute a module providing as an output a negotiation reliability score to assign to a negotiation exchange with the given LOM module;

negotiating at runtime, by the GOM module, the at least one negotiable parameter of a specific production order with the given LOM module by means of the specific negotiation model;

obtaining an updated specific negotiation model by updating during the runtime, the specific negotiation model with tunings obtained by applying runtime data to a corresponding computed reliability module aimed at improving the negotiation reliability score;

distributing during the runtime, by the GOM module, the order execution to the given LOM module whereby an agreement on the at least one negotiable requirement having been obtained by means of the updated specific negotiation model; and executing the at least one production order to produce a product on a production line of the factory under the control of the given LOM module according to the at least one negotiable requirement obtained using the updated specific negotiation model;

wherein the GOM module has modules operating offline including a temporary storage and data cleansing (TSDC) module, a supervised/unsupervised training (TRN) module, and a training evaluation results (TER) module;

wherein the GOM module has at least one module operating online including the reliability module;

wherein the TSDC module is a staging area where the past negotiation data are temporarily stored to be cleansed and normalized into historical data;

wherein the TRN module observes the historical data and uses the historical data as training data to learn from previous negotiation threads; and wherein the TER module analyzes output from the TRN module to obtain classifications of how past negotiations behaved and the TER module updates the reliability module based on the classifications.

* * * * *

UNITED STATES PATENT AND TRADEMARK OFFICE
CERTIFICATE OF CORRECTION

| | | |
|---|---|---|
| PATENT NO. | : 12,361,351 B2 | Page 1 of 1 |
| APPLICATION NO. | : 17/307149 | |
| DATED | : May 4, 2021 | |
| INVENTOR(S) | : Giorgio Corsini et al. | |

It is certified that error appears in the above-identified patent and that said Letters Patent is hereby corrected as shown below:

In the Claims

Claim 4, Column 14, Lines 1-5 should read as follows:
wherein the GOM module has modules configured for operating offline
    including a temporary storage and data cleansing (TSDC) module, a
    supervised/unsupervised training (TRN) module, and a training
    evaluation results (TER) module;

Signed and Sealed this
Second Day of September, 2025

Coke Morgan Stewart
*Acting Director of the United States Patent and Trademark Office*